A. F. Bent,
Cheese Hoop.
No. 85,201.   Patented Dec. 22, 1868.
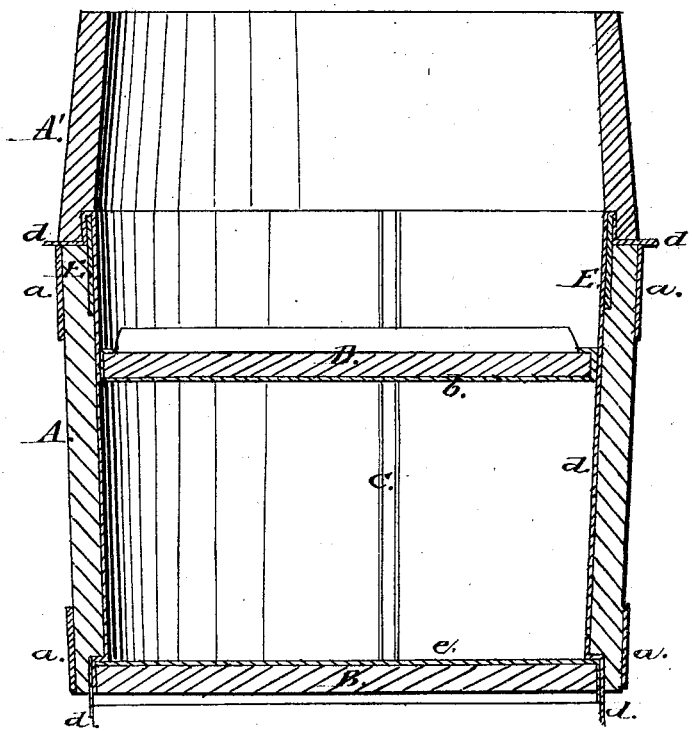

UNITED STATES PATENT OFFICE.

ALVIN F. BENT, OF ANTWERP, NEW YORK.

IMPROVEMENT IN CHEESE-HOOP.

Specification forming part of Letters Patent No. 85,201, dated December 22, 1868; antedated December 11, 1868.

*To all whom it may concern:*

Be it known that I, ALVIN F. BENT, of Antwerp, Jefferson county, New York, have invented certain new and useful Improvements in Cheese-Hoops; and do hereby declare that the following is a full, clear, and exact description thereof, reference being had to the accompanying drawings, and to the letters of reference marked thereon, making a part of this specification.

The figure in the drawings represents a section of the hoop and its follower through the central portion.

A represents a wooden or metallic hoop, whose ends are not closely connected, leaving a narrow space, within which I insert a strip, C. The exterior of this hoop has suitable bands *a a* to keep it together. B represents the bottom of the hoop which is removable at will. E represents a circular metal flange, placed on the inner part of the hoop at its top, and extends slightly above the top, as shown. A' represents a narrow hoop, which is placed upon the top of hoop A, and is held in place by the flange E. This hoop is also removable. D represents the usual follower for pressing the cheese.

In using this hoop, I place a band of cloth, *d*, all around the inner part of the lower section, A, and have the band sufficiently long enough to overlap the edges of this section at the top and bottom, as shown. I also cut a circular cloth, *e*, and place it upon the upper part of the removable bottom B, and large enough to overlap the sides thereof. The under portion of the follower is also provided with a cloth, *b*.

After the hoop A is bandaged, as described, the top A' is put on, which secures the bandage *d* between the two sections. The bottom B is then placed in, and it secures the bandage at the bottom. The curd is then placed in the hoop and suitably pressed by the follower. The brine passes out of the crevices in the sides and bottom, and through the porous cloths. The hoop A' is taken off and the bottom B taken out, leaving the cloths around the cheese. The ends thereof are turned down upon the cheese and pasted, and then the cloth *e* is pasted upon it.

Having thus fully described my invention, what I claim as new, and desire to secure by Letters Patent, is—

The arrangement of the hoop A A', its strip C, flange E, movable bottom B, and follower D, with their cloths *b*, *d*, and *e*, all constructed and used substantially as herein specified.

In testimony that I claim the foregoing I have hereunto set my hand this 21st day of April, 1868.

ALVIN F. BENT.

Witnesses:
  H. H. BENT,
  JACOB SHULL.